(12) United States Patent
Chung et al.

(10) Patent No.: US 8,941,307 B1
(45) Date of Patent: Jan. 27, 2015

(54) LIGHT CONTROL SYSTEM USING STATEMENT OF PERSONAL COMPUTER WHICH IS APPLIED TO A BUILDING FOR ENERGY SAVING AND METHOD THEREOF

(71) Applicant: Best Digital Co., Ltd., Uiwang-si (KR)

(72) Inventors: Kyung Ho Chung, Gwangmyeong-si (KR); Jae Yong Park, Anyang-si (KR); Young Suk Park, Anyang-si (KR)

( * ) Notice: Subject to any disclaimer, the term of this patent is extended or adjusted under 35 U.S.C. 154(b) by 0 days.

(21) Appl. No.: 14/091,963

(22) Filed: Nov. 27, 2013

(51) Int. Cl.
*H05B 37/02* (2006.01)

(52) U.S. Cl.
CPC ........ *H05B 37/0245* (2013.01); *H05B 37/0227* (2013.01)
USPC ............ 315/152; 315/153; 315/294; 315/312

(58) Field of Classification Search
CPC ............. H05B 7/0272; H05B 37/0218; H05B 37/0254; H05B 37/02; H05B 33/08; H05B 33/0803; H05B 33/0842; H05B 33/0845; H05B 33/0854; H05B 37/0245; Y02B 20/48; Y02B 20/40; Y02B 20/42
USPC .......................... 315/152, 153, 201, 294, 312
See application file for complete search history.

(56) References Cited

U.S. PATENT DOCUMENTS

| | | | | |
|---|---|---|---|---|
| 7,784,677 | B2 * | 8/2010 | Riahi et al. ..................... | 235/375 |
| 2009/0278479 | A1 * | 11/2009 | Platner et al. ................. | 315/312 |
| 2010/0276482 | A1 * | 11/2010 | Raihi et al. .................... | 235/375 |
| 2013/0320861 | A1 * | 12/2013 | Sinai et al. ..................... | 315/152 |
| 2014/0028199 | A1 * | 1/2014 | Chemel .......................... | 315/152 |
| 2014/0035482 | A1 * | 2/2014 | Rains et al. .................... | 315/294 |
| 2014/0244710 | A1 * | 8/2014 | Sharma et al. ................ | 709/201 |
| 2014/0252963 | A1 * | 9/2014 | Zhang et al. .................. | 315/153 |

* cited by examiner

*Primary Examiner* — Vibol Tan
(74) *Attorney, Agent, or Firm* — East West Law Group; Heedong Chae (57) ABSTRACT

The present invention relates to a light control system using statement of Personal Computer (PC) which is applied to a building for energy saving and method thereof, and more specifically, to a light control system, in which a lighting environment is changed depending on a PC operation state to provide the lighting environment optimized for a working environment and that uses a PC state and is applied to a building for energy saving in order to promote energy saving effects, and a method thereof. According to the invention, a worker's attending and leaving states and being temporarily away from his or her position are easily determined using a PC operation state and thus a light illumination intensity is adaptively adjusted. As a result, it is possible to improve energy saving effects and optimize the lighting environment.

17 Claims, 5 Drawing Sheets

LIGHT CONTROL SYSTEM USING STATEMENT OF PERSONAL COMPUTER WHICH IS APPLIED TO A BUILDING FOR ENERGY SAVING AND METHOD THEREOF

BACKGROUND OF THE INVENTION

1. Field of the Invention

The present invention relates to a light control system using statement of Personal Computer (PC) which is applied to a building for energy saving and method thereof, and more specifically, to a light control system, in which a lighting environment is changed depending on a PC operation state to provide the lighting environment optimized for a working environment and that uses a PC state and is applied to a building for energy saving in order to promote energy saving effects, and a method thereof.

2. Description of the Related Art

Illuminating lights including a fluorescent light, an incandescent light, and an LED are being installed in various places of current aggregate buildings. A system for effectively managing a plurality of illuminating lights has been settled in accordance with a recent energy saving policy. Therefore, a method in which an individual illuminating light is not directly controlled but the plurality of illuminating lights are connected to a few lighting control servers through a communication line and a control command is input to the lighting control server in order to manage the plurality of illuminating lights in an integrated manner is used.

Recently, a system for integrating and managing the illuminating lights is not limited to a simple dimming control function for energy saving but is linked with various systems, and thus the illuminating light is controlled based on an event. Therefore, a more efficient and intelligent lighting control system has been under development.

For example, in an intelligent lighting control system applied to an office environment, an illuminating light corresponding to a position of a worker is turned on or off according to whether the worker is at the office, and thus an unused illuminating light out of all illuminating lights arranged in the office is turned off to prevent unnecessary energy consumption.

However, the worker may be temporarily away from his or her position for a conference, a business trip, a meal, or the like besides simply attending or leaving. When the illuminating light is still on in this state, unnecessary energy consumption occurs.

Also, when an illuminating light corresponding to a position of a worker who is away from the office is turned off, although an illuminating light corresponding to a position of another worker who currently works is still on, an ambient illumination intensity decreases. As the number of neighboring workers who are away from the office increase, the ambient illumination intensity rapidly decreases and thus this can cause discomfort in the working environment.

Therefore, it is necessary to provide a lighting control system that can optimize a lighting environment by adaptively responding to a working state of the worker and efficiently manage energy.

RELATED TECHNICAL DOCUMENT

Patent Document

Patent Document 1: Korean Utility Model Publication No. 2001-0002179

SUMMARY OF THE INVENTION

In view of the above-described problems, the invention provides a system that can improve energy saving effects and optimize a lighting environment according to a working state of a worker. In the system, the worker's attending and leaving states and being temporarily away from his or her position are easily determined and thus a light illumination intensity is adaptively adjusted.

In addition, the invention is provided to always maintain an optimized illumination intensity for a working environment by addressing a conventional system problem that an ambient illumination intensity decreases when another worker who is adjacent to the worker is away from an office.

Furthermore, the invention is provided to reduce heat generation from an illuminating light and to improve energy saving efficiency by differentially controlling the light illumination intensity according to a PC operation state of the worker.

According to an aspect of the invention, there is provided a light control system using statement of Personal Computer (PC) which is applied to a building for energy saving. The system includes, a dimming control unit configured to perform remote dimming control on a plurality of illuminating lights to which an illuminating light identification (ID) is assigned, a communication unit that is connected to a plurality of personal computers (PCs) via a communication network, a mapping table in which at least one illuminating light ID information is grouped and is set to correspond to unique identification information of the PC, and a lighting control unit that includes a control unit configured to perform dimming control on an illuminating light ID information group that corresponds to an operation state of the PC using the communication unit and the mapping table through the dimming control unit.

The lighting control unit may use Internet protocol (IP) information or media access control (MAC) information of each PC as unique identification information and determine whether the PC operates based on whether the information is checked.

The lighting control unit may group a plurality of adjacent PCs according to setting, group a plurality of illuminating light IDs corresponding to the grouped PC group, and set a correspondence between the groups in the mapping table, and turn off an illuminating light of a corresponding illuminating light ID group only when all PCs included in the PC group do not operate based on the mapping table.

When at least one PC that is adjacent to a specific PC in use and is set as a group is in a non-operation state, the lighting control unit may perform dimming control on an illuminating light matching the PC in the non-operation state based on the mapping table and increase an ambient illumination intensity of the specific PC in use.

The lighting control system may further include an application unit that is installed in the PC and monitors a current operation state of the PC, and transmits corresponding information to the lighting control unit as operation state information for lighting control when the state is in a predetermined state.

The lighting control unit may adjust a dimming level of an illuminating light of at least one illuminating light ID corresponding to the PC having the application unit installed therein based on the operation state information received from the application unit.

When an active mode state of the PC continues or an input is continuously generated, the application unit may provide continuous usage information to the lighting control unit as operation state information, and the lighting control unit may receive the continuous usage information and forcibly adjust a dimming level of the illuminating light for reducing heat generation.

The application unit may determine whether a user having a corresponding communication unit is present through a communication unit provided in the PC, add the result to operation state information, and provide the information to the lighting control unit.

The communication unit provided in the PC may include either a module or a dongle that supports a short-distance wireless communication method including a WiFi, a Bluetooth, a Zigbee, and visible light communication or a serial communication method.

The application unit may authenticate a user having a corresponding communication unit determined from the communication unit provided in the PC, transmit the operation state information on only the authenticated user, and thus lighting control of the lighting control unit may be performed, and the user authentication information may be managed as working state information of the authenticated user in the application unit or in the lighting control unit that has received the operation state information.

The lighting control unit may link with a sensor, which is provided to correspond to the illuminating light, to detect a user and use user detection information as information for dimming control determination through the PC state.

According to another aspect of the invention, there is provided a light control method using statement of Personal Computer (PC) which is applied to a building for energy saving. The method includes, a first operation in which a lighting control unit configured to perform dimming control on a plurality of illuminating lights checks an operation state of the PC by identifying unique identification information of at least one PC via a communication network, a second operation of checking a mapping table in which at least one illuminating light ID information is grouped and is set to correspond to unique identification information of the PC, and a third operation in which the lighting control unit outputs a signal for dimming control of an illuminating light of at least one corresponding illuminating light ID checked through the second operation based on an operation state of the PC checked through the first operation.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, a light control system using statement of Personal Computer (PC) which is applied to a building for energy saving according to an embodiment of the invention will be described in detail with reference to the drawings.

Figure 1:
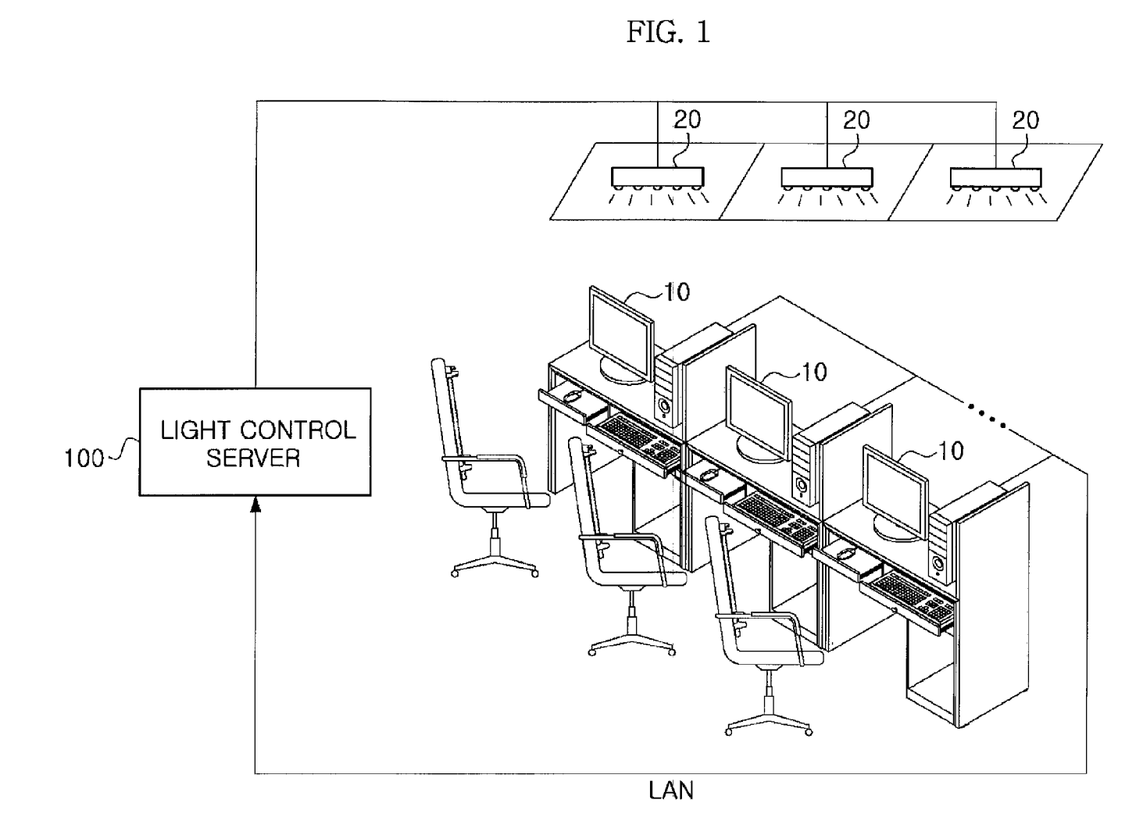
FIG. 1 is a conceptual diagram illustrating a light control system using statement of Personal Computer (PC) which is applied to a building for energy saving according to an embodiment of the invention.

FIG. 1 is a conceptual diagram illustrating a light control system using statement of Personal Computer (PC) which is applied to a building for energy saving according to the embodiment of the invention. As illustrated, a plurality of personal computers (PC) 10 are connected to a lighting control server 100 that controls an illuminating light 20 via a wireless and/or wired network using a communication network (such as a LAN network, an intra-network, a building network, and Internet). A plurality of illuminating lights 20, which are installed to correspond to each PC or an access point (AP) area for wireless connection, are connected to the lighting control server 100 through a control line and a power line.

In this case, the lighting control server 100 performs dimming control on the plurality of illuminating lights 20, determines an operation state of each PC 10 through the communication network, and thus may perform dimming control on the illuminating light 20 corresponding for each PC 10. Although each PC 10 and each illuminating light 20 may have an one-to-one correspondence, an ambient illumination intensity around a user may be decreased due to an unused illuminating light. Therefore, it is preferable that a group of the plurality of illuminating lights correspond to a single PC.

Figure 2:
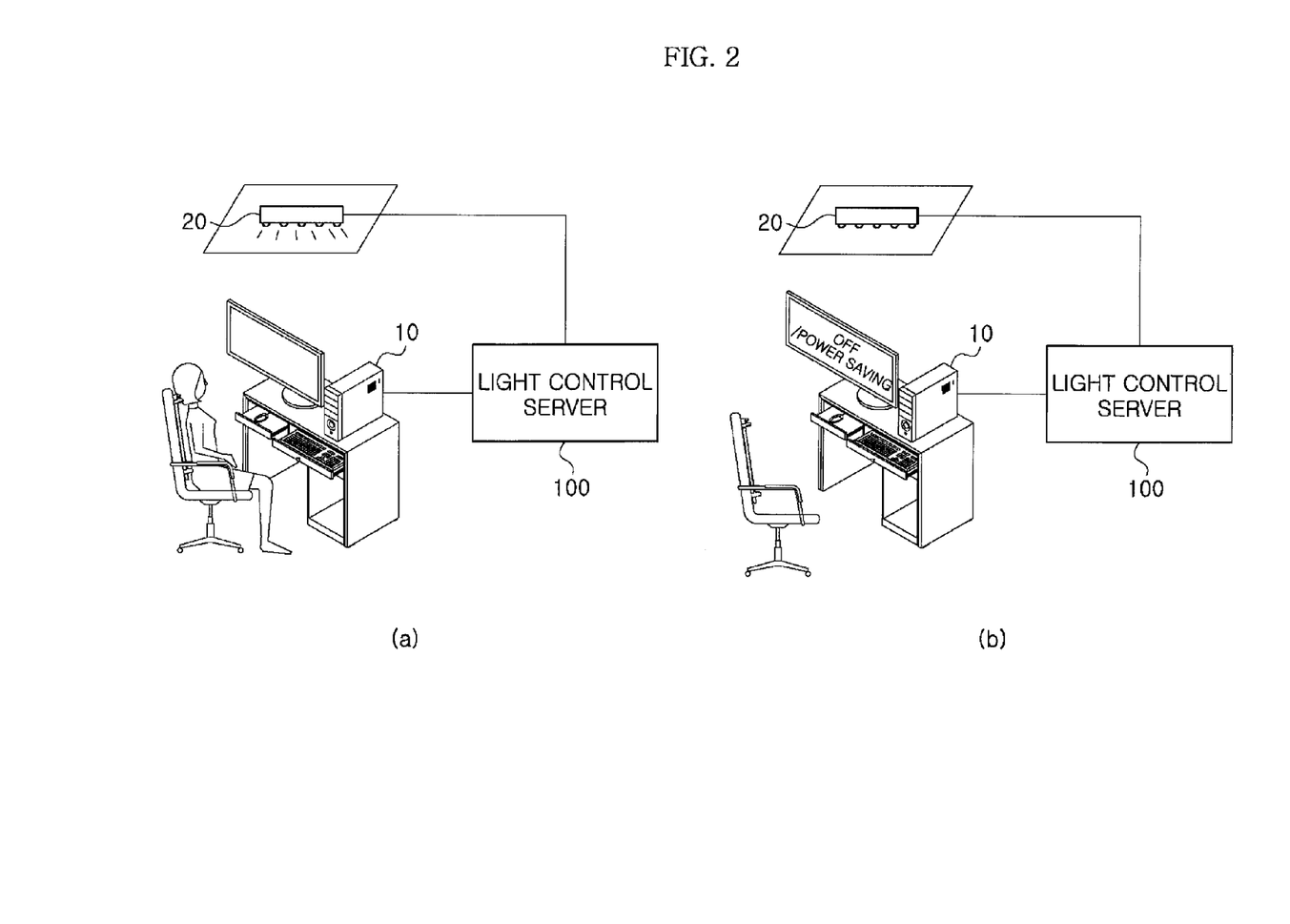
FIG. 2 is a conceptual diagram illustrating an operation of the light control system using statement of PC which is applied to a building for energy saving according to the embodiment of the invention.

For example, as illustrated in FIG. 2, when power is applied to the PC 10 and a network connection with the lighting control server 100 is activated, the lighting control server 100 may obtain Internet protocol (IP) information, media access control (MAC) information, or other unique identifier of the PC 10 of which power is turned on through the communication network, and thus it is possible to determine whether each PC 10 operates based on the obtained information.

Therefore, as illustrated in FIG. 2A, when the PC is activated in response to an operation state of the PC 10 (a user is present), the lighting control server 100 may perform control such that the illuminating light 20 is turned on or the illumination intensity increases. As illustrated in FIG. 2B, when the user is not at the office or is temporarily away from his or her position and thus power of the PC is turned off or the PC is in a power saving mode in which the network connection is blocked, it is possible to save energy by turning off the unnecessary illuminating light 20 or decreasing the illumination intensity.

The PC includes various wired and wireless computing devices such as a smartphone, a tablet PC, a laptop, industrial automation equipment, and an office OA device.

The illuminating light 20 may include a fluorescent lamp, an incandescent lamp, an LED lamp, a halogen lamp, or the like. In simple lighting control, a type of the lamp is irrelevant. However, when dimming control is performed, it is preferable that a lamp capable of dimming controlling be used. This embodiment exemplifies a case in which dimming control is performed using the LED lamp.

Based on the above description, a detailed configuration of the light control system using statement of PC which is applied to a building for energy saving according to the embodiment of the invention will be described with reference to FIG. 3.

As illustrated, the lighting control server 100 that controls the illuminating light may include a communication unit 110 that is connected to the PC 10 via the communication network and receives data, a data processing unit 120 configured to process the data received through the communication unit 110, a control unit 130 configured to perform control on a related illuminating light by comparing information stored in a DB unit 150 with information provided from the data processing unit 120, and a power supplying unit 140 configured to supply power received from the outside according to a control signal of the control unit 130. Here, the DB unit 150 may be included in the lighting control server 100 and the power supplying unit 140 may be separately configured as a separated component or may also be provided for each illuminating light. The data processing unit 120 may also be integrated with the communication unit 110.

Internally, the control unit 130 may be divided into a dimming control part that performs remote dimming control and a control part that selects illuminating lights to be dimming controlled corresponding to the PC depending on a state of the PC 10 checked through the communication unit 110 and the data processing unit 120 and controls the illuminating lights through the dimming control part.

Based on the above configuration, a detailed process of the lighting control server 100 that is connected and operated with the PC will be described. The data processing unit 120 processes data transmitted from the PC 10 and may provide unique identification information of the PC to the control unit 130. In addition, the control unit 130 may identify the activated PC 10 when the unique identification information of the PC is received, and compare the unique identification information (such as MAC and IP) with information stored in the DB unit 150. Another identifier other than the MAC information may also be used.

In this case, as illustrated, the DB unit 150 may include a lighting storage unit 152 in which an illuminating light ID and location information for each illuminating light ID are stored, and a PC storage unit 153 in which PC identification information such as the IP, the MAC information, or separate unique identification information are stored.

In the DB unit 150, the lighting storage unit 152 and the PC storage unit 153 are mutually corresponded, and identification information (or AP identification information) of each PC 10 and at least one illuminating light ID information (location information for each illuminating light ID, as necessary) are stored as a mapping table 151. Therefore, the control unit 130 may extract the identification information of the PC 10 or the illuminating light ID corresponding to connection AP identification information of the PC 10 that is wirelessly connected. In this case, the illuminating light ID, which corresponds to the identification information (or AP identification information) of the PC 10, may be set as plural. Therefore, a plurality of illuminating light IDs may be extracted from the single PC 10 (or AP identification information). That is, the plurality of illuminating light IDs are grouped as a group and may correspond to one subject of usage (PC or AP to which the PC is wirelessly connected), and may be classified as a main illuminating light or an adjacent illuminating light to be differently dimmed, as necessary.

Then, the control unit 130 performs control such that the power supplying unit 140 supplies power to an illuminating light corresponding to the extracted illuminating light ID and thus brightness may be adjusted by dimming or turning on the illuminating light corresponding to the activated PC 10.

Figure 4:
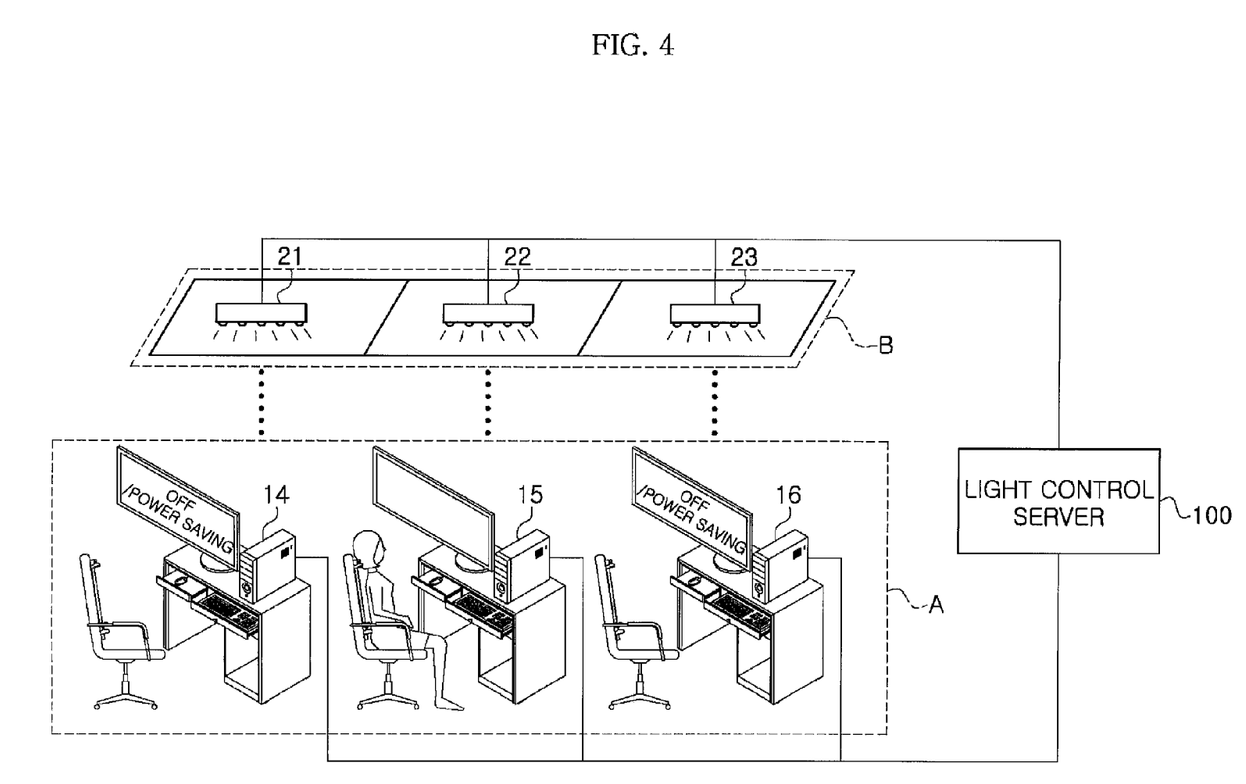
FIG. 4 is a conceptual diagram illustrating control when a correspondence is set between a PC group and an illuminating light group in the light control system using statement of PC which is applied to a building for energy saving according to the embodiment of the invention.

As illustrated in FIG. 4, in the DB unit 150, a plurality of adjacent PCs 14, 15, and 16 are grouped, a plurality of illuminating lights 21, 22, and 23, which correspond to a grouped PC group (A), are grouped (in reality, a plurality of illuminating light IDs are grouped), and thus the mapping table 151 may be set such that PCs and illuminating lights have a group (A) to group (B) correspondence.

Accordingly, when unique identification information (unique identification information of the PC or unique identification information of the AP to which the corresponding PC is wirelessly connected) is received from at least one PC included in the PC group (A), the control unit 130 extracts a plurality of illuminating light IDs that are included in the corresponding illuminating light group (B) and thus may control brightness by dimming control or turning on the illuminating lights 21, 22, and 23 that correspond to the illuminating light IDs.

For example, while two PCs 14 and 16 are in a non-operation state in which power is turned off and one PC 15 is in an active state in which power is turned on in the PC group (A) in which three PCs are grouped, when unique identification information of the PC 15 in which power is turned on is received and it is identified as the PC 15 included in the PC group (A), brightness may be brightly adjusted by turning on all of the plurality of illuminating lights 21, 22, and 23 included in the corresponding illuminating light group (B) or dimming control. In this case, it is preferable that the PCs 14, 15, and 16 included in the generated PC group (A) be composed of adjacent PCs.

In other words, only when users stop to operate all PCs included in the PC group (A) (such as power off or network blocking in a standby mode), illuminating lights of the illuminating light group (B) corresponding to the PC group (A) are turned off or dimming control is performed such that the illuminating light is dimmed to a predetermined brightness level. In this way, even when the number of PC users decreases, the illuminating light is maintained until the last user is away from his or her position.

Referring again to FIG. 3, a location for each illuminating light ID may be set in the mapping table 151. Based on the mapping table 151, the control unit 130 may determine a location of an illuminating light adjacent to the illuminating light 20 corresponding to the PC 10 of which unique identification information is received. When the adjacent illuminating light is turned off, the control unit 130 may turn on the adjacent illuminating light to increase the ambient illumination intensity. In this way, it is possible to create a comfortable working environment.

More intelligently, when there are a few users, dimming control is performed such that brightness of an illuminating light that is far away from the PC in use decreases first based on a proximity level of the illuminating light in the illuminating light group. Therefore, it is possible to suppress an ambient brightness change felt by the user according to the number of actual PC users and to reduce power consumption. This may be similarly applied between illuminating light groups. When there are a plurality of illuminating light groups and PC groups in the office but only a few users use PCs, an illuminating light adjacent to a corresponding PC user is brightly adjusted and an illuminating light, that is located in an area in which the PC is not used and is far away from the PC user, may be dimly adjusted (it means that, even though the PC user is absent and thus the illuminating light is turned off, when a user uses a PC in another location, dimming control is performed on the illuminating light turned off according to a distance and thus it is possible to provide a predetermined brightness level).

In the above-described configuration, it is determined whether the user is present only based on its own network activation of the PC. Therefore, a waiting time is necessary for substantial lighting control and it is difficult to perform more intelligent lighting control. In order to perform more intelligent lighting control, an additional component capable of identifying a user state or a PC state may be added to the PC.

That is, the PC 10 may include an application unit 11 configured to generate information on an operation state of the PC 10. When the application unit 11 monitors a state of the PC and the state is in a predetermined state, generated information on this state may be transmitted to the lighting control server 100 as operation state information for lighting control.

The application unit 11 monitors an operation state of an operating system and thus may determine whether a mode thereof is an active mode or any mode among one or more modes for power saving supported in the operating system and may determine how long a delay time is after the mode is switched. The determined state may be transmitted to the lighting control server 100 as the operation state information.

In this case, the mode for power saving supported in the operating system may include a standby mode, a power saving mode, a maximum power saving mode, a hybrid power saving mode, or the like which are classified for each step. That is, while the mode is in a general standby mode and thus a network connection is activated, when the standby mode is maintained for a predetermined time, the application unit 11 delivers this state to the lighting control server 100 as the operation state information. Therefore, it is possible to reduce a time for determining whether lighting control is necessary.

The data processing unit 120 of the lighting control server 100 may provide data including the operation state information and the identification information (PC or AP) to the control unit 130 through the communication unit 110. The control unit 130 may perform control such that a dimming control signal having a different dimming level according to each mode of the operating system included in the operation state information is transmitted to the illuminating light corresponding to the PC identification information through a control line.

To this end, the dimming level corresponding to each mode may be set previously in the control unit 130 or the mapping table 151. In addition, the dimming level may be differently set for each PC and thus each user may set a desired dimming level. In this way, it is possible to provide a working environment optimized for each user.

As described above, when the user is temporarily away from his or her position due to a conference, a business trip, a meal, or the like while the PC is turned on, the application unit 11 may easily determine this state and provide related information to the lighting control server 100. In response to the information, the lighting control server 100 controls an illumination intensity of the illuminating light 20. In this way, it is possible to prevent unnecessary energy consumption and significantly reduce heat generation from the illuminating light.

In other words, as a waiting time for power saving increases, when the operating system subdivides the mode state for power saving in steps by blocking power supply for hardware in steps, the application unit 11 determines each mode (or a single mode is subdivided by a time) divided into steps, provides a determination result to the lighting control server 100 as the operation state information. The lighting control server 100 gradually reduces a light illumination intensity in response to a mode change of the operating system. Therefore, it is possible to perform more efficient energy management and heat generation adjustment.

In addition, the application unit 11 may determine generation of a continuous input (an input using an user interface such as a keyboard input, a mouse input, a touch input, and a motion sensor) in the PC 10. Since this happens when the user intensively uses the PC, information on generation of a continuous input may be provided to the lighting control server 100 as the operation state information. In this case, the information on generation of a continuous input may be generated by the application unit 11 when a value of an external input generated for a predetermined time is greater than a predetermined value.

Accordingly, the control unit 130 that has received the operation state information of continuous input generation through the communication unit 110 and the data processing unit 120 may decrease an illumination intensity of a related illuminating light to a predetermined level. When the user concentrates on his or her work, the user is insensitive to the light illumination intensity. Therefore, without significantly changing the illumination intensity level, the brightness is controlled such that the lamp is adjusted not to have 100% of brightness or the brightness is gradually changed to a predetermined low level and then is restored. In this way, it is possible to reduce heat generation from the lamp and power consumption. Further, it is possible to significantly increase a life of the lamp.

Figure 3:
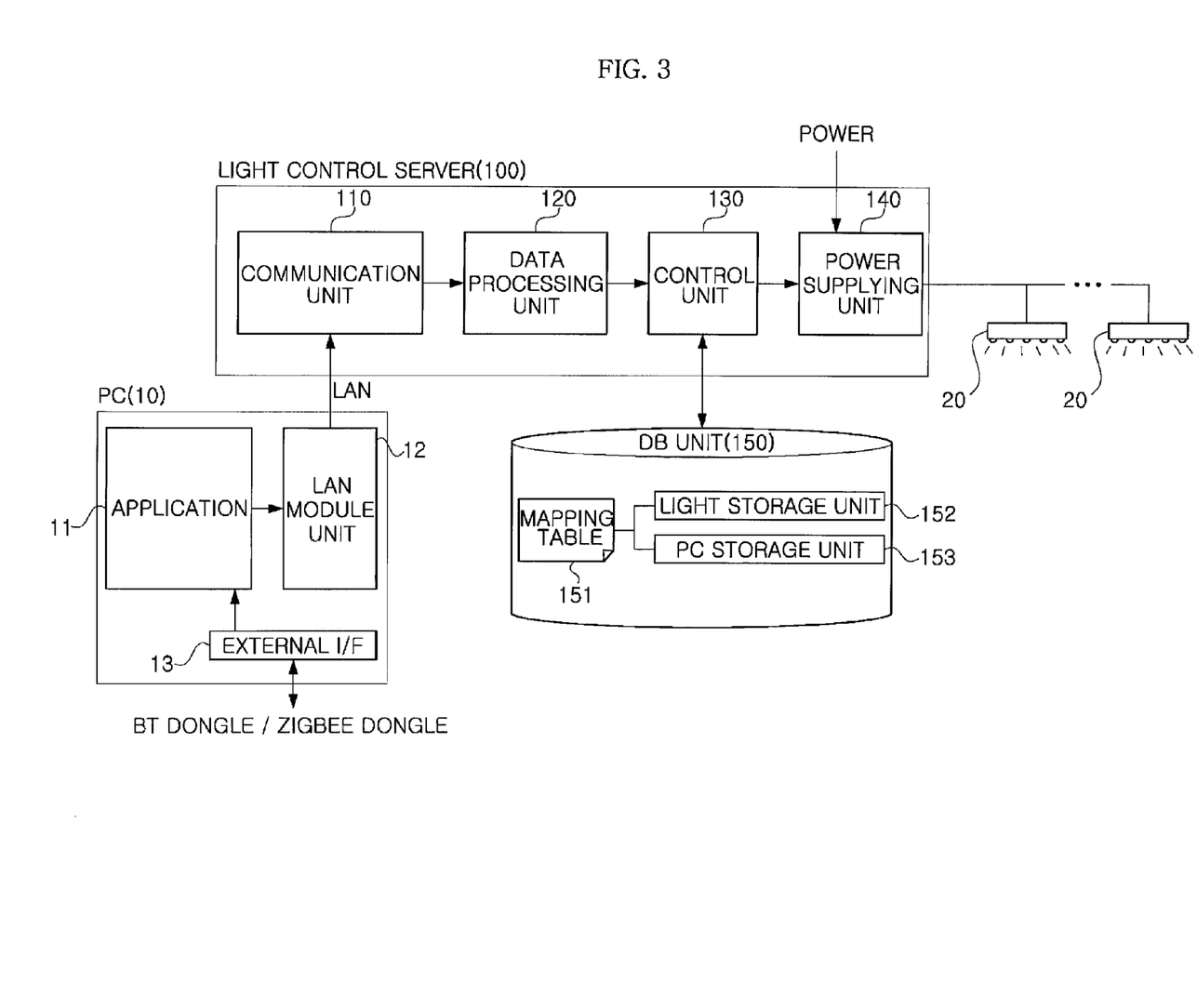
FIG. 3 is a diagram illustrating a detailed configuration of the light control system using statement of PC which is applied to a building for energy saving according to the embodiment of the invention.
Figure 5:
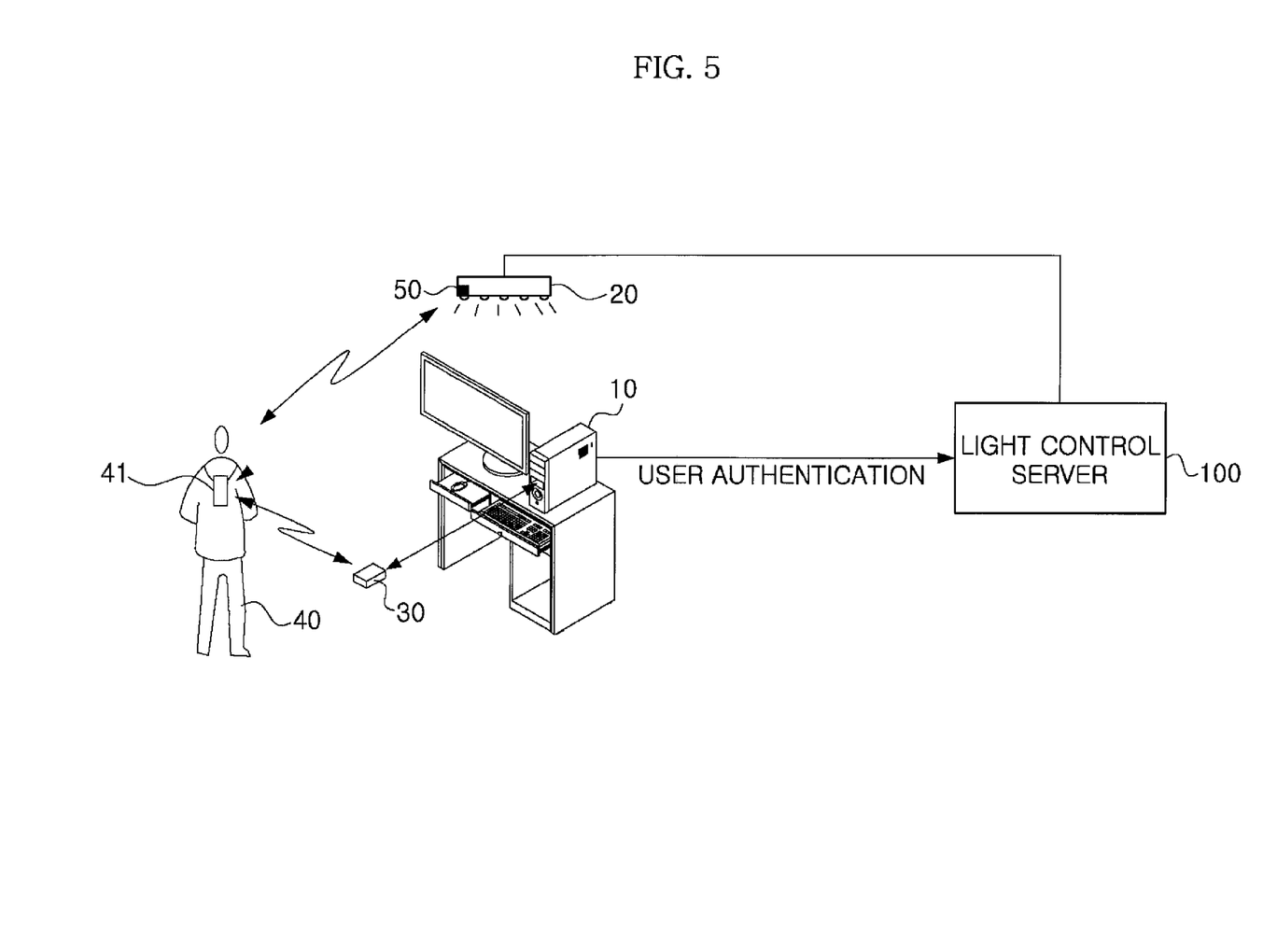
FIG. 5 is a conceptual diagram illustrating lighting control according to user identification of the light control system using statement of PC which is applied to a building for energy saving according to the embodiment of the invention.

As illustrated in FIGS. 3 and 5, the application unit 11 may check states of a wireless module 30 connected to an interface 13 supported by the PC, an internal wireless module or function unit (such as a WiFi, a Bluetooth, a Zigbee, and visible light communication). The wireless module 30 includes an access point (AP), a Bluetooth dongle, a Zigbee dongle, a visible light communication device, or the like, and may transmit user information received from a smartphone of a user 40 or a wireless device 41 such as a separate communication device (such as a pass and an employee card) to the application unit 11.

Therefore, the application unit 11 receives information on whether the user is present or is adjacently located and user authentication information using predetermined wireless communication, adds the received information to the operation state information, and then may provide the added information to the lighting control server 100. In this way, even when a current mode of the PC is in a standby mode, the lighting control server 100 may turn on a corresponding illuminating light or maintain a dimming level corresponding to a PC active mode.

That is, when the user 40 stays in front of the PC without being away from his or her position and concentrates on doing another work, it is necessary to keep the illuminating light 20 on or not to decrease the illumination intensity. Therefore, it is determined whether the user 40 is present and then additional control is performed on the illuminating light 20 to keep a current illumination intensity.

On the other hand, when the user 40 left his or her position and is outside of a communication range of the wireless module 30, the application unit 11 may generate operation state information according to a mode change of the operating system and provide the generated information to the lighting control server 100.

In addition to a user detection method using the wireless module 30, when charging or data exchange is performed through a serial communication method in which the smartphone of the user or the separate communication device is connected to the PC using a cable, the application unit 11 may recognize the smartphone of the user or the separate communication device through the serial communication method.

In this way, the application unit 11 may determine whether the user is present based on a connection between the smartphone of the user or the separate communication device and the PC through the serial communication method. In accordance with this, lighting control operation may be performed likewise the user detection method using the wireless module 30.

In addition, based on user information received through a wireless communication method using the wireless module 30 connected to the PC or received from the wireless device 41 through the serial communication method, the application unit 11 may authenticate the user 40 and transmit the operation state information on only the authenticated user 40 to the lighting control server 100.

Further, the application unit 11 or the lighting control server 100, that receives the operation state, may record the operation state information and use the information as working state information including a user attending or leaving record. The working state information may be stored in the DB unit 150 or may also be delivered to a separate external server.

In addition to using the wireless module 30, when a sensor unit 50 that corresponds to the illuminating light 20, such as a Doppler sensor, a light sensor, and a human detection sensor, is installed, the control unit 130 of the lighting control server 100 receives sensing information through a control line for dimming control. Although a condition corresponds to turning off the illuminating light or a dimming level change according to the operation state information, when the user is detected through the sensing information, the control unit 130 performs control such that a dimming level corresponding to the active mode or a lighting state is maintained before the operation state information received from the application unit 11 is used. As the sensing information is used as additional information for dimming control determination, it is possible to increase reliability. That is, the sensing information is used as information for additional determination and may be used to turn on the illuminating light before the PC is turned on.

When a location of the PC is frequently changed or a mobile PC such as a laptop is used, a correspondence between the PC and the illuminating light may be frequently changed. Therefore, instead of the sensor unit 50 of the illuminating light, a wireless communication unit, that corresponds to a wireless communication unit (such as a Bluetooth, a Zigbee, a WiFi, and visible light communication) capable of being installed in or added to the PC, is added to the illuminating light. In this way, it is possible to set a variable correspondence between the PC and the illuminating light.

In the invention, the worker's attending and leaving states and being temporarily away from his or her position are easily determined using a PC operation state and thus the light illumination intensity is adaptively controlled. As a result, it is possible to improve energy saving effects and optimize the lighting environment.

In addition, according to the invention, although the ambient illumination intensity decreases as another worker who is adjacent to the worker is away from the office, the illumination intensity of grouped illuminating lights is maintained without change when the worker is located in the group through group setting between the PC and the illuminating light. As a result, it is possible to always provide an optimized lighting environment.

Furthermore, according to the invention, a working time that is not susceptible to the lighting environment is determined based on a PC usage degree of the worker and thus the light illumination intensity is differentially controlled. As a result, it is possible to reduce heat generation from the illuminating light and significantly improve energy saving efficiency.

Moreover, according to the invention, a component for user detection is added to easily determine whether the user performs a task other than tasks using the PC. As a result, it is possible to maintain the illumination intensity optimized for the working environment.

While exemplary embodiments of the invention have been described with reference to the accompanying drawings, the invention is not limited to the above-mentioned embodiments but may be manufactured as various forms. It will be understood by those skilled in the art that various changes in a form and details may be made without departing from the spirit and scope of the invention. Therefore, the above-mentioned embodiments should be considered in a descriptive senses only and not for purposes of limitation.

What is claimed is:

1. A light control system using statement of Personal Computer (PC) which is applied to a building for energy saving, the system comprising:
    a dimming control unit configured to perform remote dimming control on a plurality of illuminating lights to which an illuminating light ID is assigned;
    a communication unit that is connected to a plurality of personal computers (PCs) via a communication network;
    a mapping table in which at least one illuminating light ID information is grouped and is set to correspond to unique identification information of the PC; and
    a lighting control unit that includes a control unit configured to perform dimming control on an illuminating light ID information group that corresponds to an operation state of the PC using the communication unit and the mapping table through the dimming control unit.

2. The system according to claim 1, wherein the lighting control unit uses Internet protocol (IP) information or media access control (MAC) information of each PC as unique identification information and determines whether the PC operates based on whether the information is checked.

3. The system according to claim 1, wherein the lighting control unit groups a plurality of adjacent PCs according to setting, groups a plurality of illuminating light IDs corresponding to the grouped PC group, and sets a correspondence between the groups in the mapping table, and turns off an illuminating light of a corresponding illuminating light ID group only when all PCs included in the PC group do not operate based on the mapping table.

4. The system according to claim 1, wherein, when at least one PC that is adjacent to a specific PC in use and is set as a group is in a non-operation state, the lighting control unit performs dimming control on an illuminating light matching the PC in the non-operation state based on the mapping table and increases an ambient illumination intensity of the specific PC in use.

5. The system according to claim 1, further comprising an application unit that is installed in the PC and monitors a current operation state of the PC, and transmits corresponding information to the lighting control unit as operation state information for lighting control when the state is in a predetermined state.

6. The system according to claim 5, wherein the lighting control unit adjusts a dimming level of an illuminating light of at least one illuminating light ID corresponding to the PC having the application unit installed therein based on the operation state information received from the application unit.

7. The system according to claim 6, wherein, when an active mode state of the PC continues or an input is continuously generated, the application unit provides continuous usage information to the lighting control unit as operation state information, and the lighting control unit receives the continuous usage information and forcibly adjusts a dimming level of the illuminating light for reducing heat generation.

8. The system according to claim 5, wherein the application unit determines whether a user having a corresponding communication unit is present through a communication unit provided in the PC, adds the result to operation state information, and provides the information to the lighting control unit.

9. The system according to claim 8, wherein the communication unit provided in the PC includes either a module or a dongle that supports a short-distance wireless communication method including a WiFi, a Bluetooth, a Zigbee, and visible light communication or a serial communication method.

10. The system according to claim 8, wherein the application unit authenticates a user having a corresponding communication unit determined from the communication unit provided in the PC, transmits the operation state information on only the authenticated user, and thus lighting control of the lighting control unit is performed, and the user authentication information is managed as working state information of the authenticated user in the application unit or in the lighting control unit that has received the operation state information.

11. The system according to claim 1, wherein the lighting control unit that links with a sensor, which is provided to correspond to the illuminating light, to detect a user and uses user detection information as information for dimming control determination through the PC state.

12. A light control method using statement of Personal Computer (PC) which is applied to a building for energy saving, the method comprising:

a first operation in which a lighting control unit configured to perform dimming control on a plurality of illuminating lights checks an operation state of the PC by identifying unique identification information of at least one PC via a communication network;

a second operation of checking a mapping table in which at least one illuminating light ID information is grouped and is set to correspond to unique identification information of the PC; and a third operation in which the lighting control unit outputs a signal for dimming control of an illuminating light of at least one corresponding illuminating light ID checked through the second operation based on an operation state of the PC checked through the first operation.

13. The method according to claim 12, wherein the operation state information includes IP or MAC information, and in the third operation, the grouped illuminating light is turned on or off based on whether the IP or MAC information is checked.

14. The method according to claim 12, wherein in the third operation, a plurality of adjacent PCs are grouped according to setting, a plurality of illuminating light IDs corresponding to the grouped PC group are grouped, a correspondence between the groups is set in the mapping table, and an illuminating light of a corresponding illuminating light ID group is turned off only when all PCs included in the PC group do not operate based on the mapping table.

15. The method according to claim 12, wherein in the third operation, when at least one PC that is adjacent to a specific PC in use and is set as a group is in a non-operation state, dimming control is performed on an illuminating light matching the PC in the non-operation state based on the mapping table and thus an ambient illumination intensity of the specific PC in use increases.

16. The method according to claim 12, wherein, when an application unit provided in the PC monitors a current operation state and the state is in a predetermined state, the first operation further includes an operation of transmitting corresponding information to the lighting control unit as operation state information for lighting control, and in the third operation, light dimming control of an illuminating light ID corresponding to the PC having the application unit installed therein is differently performed using the received operation state information.

17. The method according to claim 16, wherein in the first operation, when an active mode state of the PC continues or an input is continuously generated, the application unit provides continuous usage information to the lighting control unit as operation state information, and in the third operation, the lighting control unit receives the continuous usage information and forcibly adjusts a dimming level of the illuminating light for reducing heat generation.

* * * * *